United States Patent
Hu et al.

(10) Patent No.: US 12,025,732 B2
(45) Date of Patent: Jul. 2, 2024

(54) METHOD FOR ADJUSTING LASER RADAR, LASER DEVICE AND LASER RADAR

(71) Applicant: Leishen Intelligent System Co., Ltd., Guangdong (CN)

(72) Inventors: Xiaobo Hu, Shenzhen (CN); Ying Liu, Shenzhen (CN)

(73) Assignee: LEISHEN INTELLIGENT SYSTEM CO., LTD., Shenzhen (CN)

(*) Notice: Subject to any disclaimer, the term of this patent is extended or adjusted under 35 U.S.C. 154(b) by 0 days.

(21) Appl. No.: 18/220,243

(22) Filed: Jul. 10, 2023

(65) Prior Publication Data
US 2023/0350016 A1    Nov. 2, 2023

Related U.S. Application Data

(63) Continuation of application No. PCT/CN2021/142665, filed on Dec. 29, 2021.

(51) Int. Cl.
*G01S 7/40* (2006.01)
*G01S 7/282* (2006.01)
*G01S 7/481* (2006.01)

(52) U.S. Cl.
CPC ............ *G01S 7/4008* (2013.01); *G01S 7/282* (2013.01); *G01S 7/4818* (2013.01)

(58) Field of Classification Search
CPC ...... G01S 7/282; G01S 7/4008; G01S 7/4815; G01S 7/4818; G01S 7/497
See application file for complete search history.

(56) References Cited

U.S. PATENT DOCUMENTS

| 11,614,542 B1* | 3/2023 | Nikitin | G01S 17/89 356/4.01 |
|---|---|---|---|
| 2014/0268098 A1 | 9/2014 | Schwarz et al. | |
| 2019/0212451 A1* | 7/2019 | Viswanathan | G01S 7/4868 |

FOREIGN PATENT DOCUMENTS

| CN | 103033944 A | 4/2013 |
|---|---|---|
| CN | 204045920 U | 12/2014 |
| CN | 105278115 A | 1/2016 |
| CN | 106602392 A | 4/2017 |
| CN | 108462027 A | 8/2018 |
| CN | 109374261 A | 2/2019 |
| CN | 110233413 A | 9/2019 |

(Continued)

OTHER PUBLICATIONS

International Search Report of PCT Patent Application No. PCT/CN2021/142665 dated Sep. 20, 2022.

*Primary Examiner* — Timothy X Pham
(74) *Attorney, Agent, or Firm* — IPRO, PLLC

(57) ABSTRACT

A laser device is capable of coaxially outputting visible light and invisible light. The laser device includes a seed source outputting the invisible light, a visible light source outputting the visible light, a first wavelength division multiplexing module and N amplification modules, N is a positive integer. The seed source outputs pulsed laser to the amplification modules. The amplification modules perform power amplification on a signal passing therethrough to obtain a signal with power amplified. The first wavelength division multiplexing module performs wavelength division multiplexing processing on the visible light and the invisible light to ensure that an output end of the laser device is capable of coaxially outputting the visible light and the invisible light.

17 Claims, 13 Drawing Sheets

(56) References Cited

FOREIGN PATENT DOCUMENTS

| | | |
|---|---|---|
| CN | 111442910 A | 7/2020 |
| CN | 112365545 A | 2/2021 |
| CN | 114502978 A | 5/2022 |
| JP | 2001083557 A | 3/2001 |

* cited by examiner

METHOD FOR ADJUSTING LASER RADAR, LASER DEVICE AND LASER RADAR

CROSS-REFERENCE TO RELATED APPLICATIONS

The present disclosure is a continuation of International Application No. PCT/CN2021/142665, filed on Dec. 29, 2021, titled "method for adjusting laser radar, laser device, laser radar and application thereof", the contents of which are incorporated herein by reference.

TECHNICAL FIELD

The present disclosure relates to the technical field of laser instruments, and in particularly, relates to a method for adjusting laser radar, a laser device and a laser radar.

BACKGROUND

Optical fiber laser devices have outstanding advantages, such as small volume, high efficiency, good beam quality and convenient thermal management, and thus they are developing extremely rapidly and have been widely used in industry and national defense and other fields and exhibited a great prospect for development. For example, laser radar made of an optical fiber laser device has been widely used in automatic driving, mapping, robot navigation, space modeling and other scenes.

For laser radar, optical path adjusting is necessary before leaving the factory, so as to ensure parameters such as azimuth and divergence angles of the laser emitted. Because the light emitted by laser radar is generally invisible light, invisible light cameras (such as short infrared cameras) are usually used in the industry currently for adjusting, such as angle adjustment or the like, but the price of invisible light cameras is high, which is not conducive to reducing production cost for enterprises.

SUMMARY

An embodiment of the present disclosure provides a method for adjusting a laser radar, the laser radar includes a laser device and a collimation lens, the laser device is capable of coaxially outputting visible light and invisible light, and the method includes:
  providing a laser collimator and a target surface, and setting a second distance according to wavelength of a invisible light of the laser device, the second distance being a distance between a lens of the laser collimator and the target surface;
  obtaining a test deviation value about the second distance according to the wavelength of the invisible light and the wavelength of the visible light of the laser device;
  adjusting the second distance according to the test deviation value to obtain a corrected second distance; and
  making the laser device output the visible light according to the corrected second distance, and adjusting a first distance until the area of a spot of the visible light on the target surface reaches a minimum value, thereby completing the adjusting for the laser radar, the first distance being a distance between the laser device and the collimation lens.

Another embodiment of the present disclosure provides a laser device, the laser device is capable of coaxially outputting visible light and invisible light, the laser device includes a seed source configured to output the invisible light, a visible light source configured to output the visible light, a first wavelength division multiplexing module and N amplification modules, N being a positive integer; wherein
  the seed source is configured to output pulsed laser to the amplification modules;
  the amplification modules are configured to perform power amplification on a signal passing therethrough to obtain a signal with power amplified;
  the first wavelength division multiplexing module is configured to perform wavelength division multiplexing processing on the visible light and the invisible light to ensure that an output end of the laser device is capable of coaxially outputting the visible light and the invisible light.

Still another embodiment of the present disclosure provides a laser radar. The laser radar includes a collimation lens and the above-mentioned laser device. Light emitted by the laser device is projected onto the collimation lens.

BRIEF DESCRIPTION OF THE DRAWINGS

In order to explain specific embodiments of the present disclosure or technical solutions in the prior art more clearly, attached drawings required in the description of the specific embodiments or the prior art will be briefly introduced hereinafter; obviously, the attached drawings in the following description are some embodiments of the present disclosure, and other attached drawings can be obtained according to these attached drawings without creative labor for those of ordinary skill in the art.

DETAILED DESCRIPTION

Figure 1:
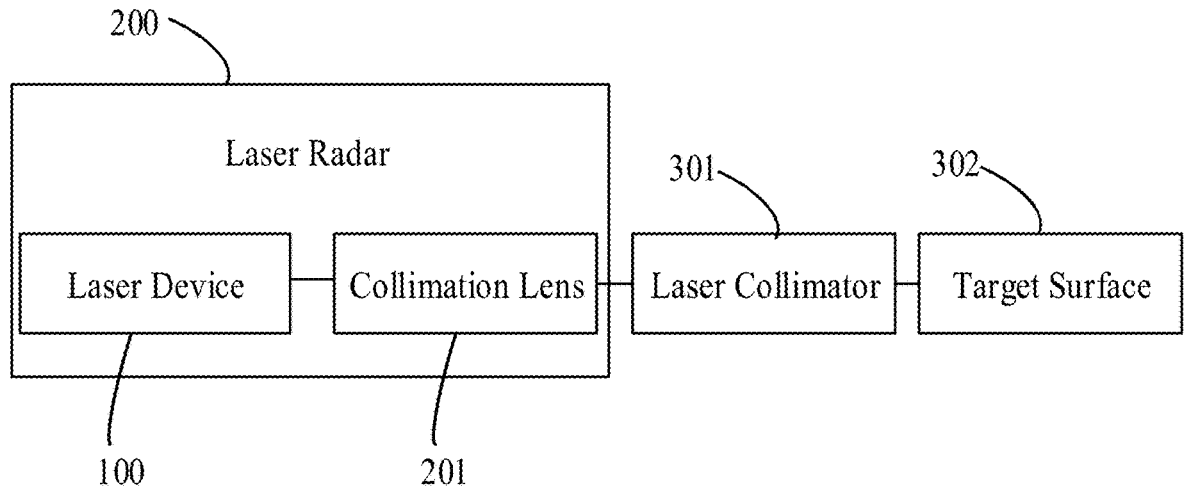
FIG. 1 is a schematic view of a method for adjusting laser radar provided according to an embodiment of the present disclosure.

Hereinafter, embodiments of the present disclosure will be described in detail, examples of which are illustrated in the accompanying drawings, wherein the same or similar reference numerals indicate the same or similar elements or elements having the same or similar functions throughout the description. The embodiments described below with reference to the attached drawings are exemplary, and these embodiments are only used for explaining the present disclosure, and should not be construed as limiting the present disclosure.

In the description of the present disclosure, it shall be appreciated that, orientations or positional relationships indicated by terms such as "center", "longitudinal", "lateral", "length", "width", "thickness", "top", "bottom", "front", "back", "left", "right", "vertical", "horizontal", "top", "bottom", "inner", "outer", "clockwise", "anticlockwise", "axial direction", "radial direction", "circumferential direction" or the like are orientations or positional relationships shown based on the attached drawings; these terms are only used for the convenience of describing the present disclosure and simplifying the description, and do not indicate or imply that the referred devices or elements must have specific orientations, be constructed and operated in specific orientations, and thus these terms should not be construed as limiting the present disclosure.

In addition, the terms "first" and "second" are only used for the descriptive purpose, and should not be construed as indicating or implying relative importance or implicitly indicating the number of indicated technical features. Therefore, the features defined by "first" and "second" may include one or more of the features explicitly or implicitly. In the description of the present disclosure, "plural" means two or more, unless otherwise specifically defined.

In the present disclosure, unless otherwise specified and defined, terms such as "installation", "linkage", "connection" and "fixation" should be broadly understood; for example, elements may be fixedly connected, or detachably connected or formed integrally; elements may be mechanically connected or electrically connected; elements may be directly connected, or indirectly connected through an intervening medium, and the connection may be the internal communication of two elements or the interaction between two elements. For those of ordinary skill in the art, the specific meanings of the above terms in the present disclosure may be understood according to specific situations.

In the present disclosure, unless otherwise specified and defined, a first feature being located "above" or "below" a second feature may refer to that the first feature is in direct contact with the second feature, or the first feature is in indirect contact with the second feature through an intervening medium. Moreover, the first feature being located "on", "above" and "on top of" the second feature may mean that the first feature is directly above or obliquely above the second feature, or just mean that the level of the first feature is higher than the level of the second feature. The first feature being located "under", "below" and "beneath" the second feature may mean that the first feature is directly below or obliquely below the second feature, or just mean that the level of the first feature is lower than the level of the second feature.

As shown in FIG. 1, the present disclosure provides a method for adjusting laser radar, which is configured to perform adjusting on a laser radar 200, and the laser radar 200 includes a laser device 100 and a collimation lens 201. The laser device 100 has the characteristic of coaxially outputting visible light and invisible light. The collimation lens 201 is arranged in front of the output end of the laser device 100. A distance between the laser device 100 and the collimation lens 201 is defined as a first distance. The method for adjusting laser radar includes the following steps:

Step 1: providing a laser collimator 301 and a target surface 302.

The laser collimator 301 is arranged on one side of the collimation lens 201 far away from the laser device 100. The target surface 302 is arranged on one side of the laser collimator 301 far away from the collimation lens 201.

The distance between the laser collimator 301 and the target surface 302 is set according to the wavelength of invisible light in the laser device 100, and the distance between the laser collimator 301 and the target surface 302 at this point is defined as a second distance.

Step 2: obtaining a test deviation value about the second distance according to the wavelength of the invisible light and the wavelength of the visible light of the laser device 100.

Specifically, the test deviation value is obtained by performing the following sub-steps in a simulation system:
  positioning the laser radar 200, the laser collimator 301 and the target surface 302 according to adjustment positions;
  setting the first distance and the second distance according to the wavelength of the invisible light of the laser radar 200;
  making the laser radar 200 output visible light, and observing the spot of the visible light on the target surface 302;
  keeping the first distance unchanged, moving the target surface 302, and continuing observing the variation of the spot of the visible light on the target surface 302;
  recording a variation amount of movement of the target surface 302 if the area of the spot of the visible light on the target surface 302 reaches the minimum value, wherein the variation amount is the test deviation value of the second distance.

The deviation value in the simulation system reflects the change of the second distance caused by the change of a single variable (switching between visible light and invisible light) when the first distance remains unchanged. While in the real system, the visible light and the invisible light are output coaxially, and the same set of laser collimator and target surface are used, so the change of single variable can also be realized, and the deviation value of the simulation system can be used in the real system. However, the actual system is not perfect, and some deviation is inevitable, and thus it is necessary to adjust the first distance, i.e., fine-adjust the first distance, such that the final adjustment in the actual system is achieving.

Step 3: adjusting the second distance according to the test deviation value to obtain a corrected second distance.

Step 4: making the laser device 100 output the visible light according to the corrected second distance, and adjusting a first distance until the area of a spot of the visible light on the target surface 302 reaches a minimum value. That is, the adjusting for the laser radar 200 is thereby completed.

The method for adjusting laser radar provided according to the present disclosure may also verify the adjusted laser radar 200. The specific verification steps are as follows:

taking out a standard laser radar 200 (i.e., a laser radar 200 with correct optical path) and making the standard laser radar 200 output visible light;

making a distance between the laser collimator 301 and the target surface 302 be the corrected second distance, wherein the corrected second distance is the distance used by the adjusted laser radar 200 in adjusting;

performing the following judgment on the spot of the visible light on the target surface 302:

determining that the original laser radar 200 that was adjusted has indeed completed the adjusting of the optical path if the area of the spot of the visible light on the target surface 302 reaches the minimum value; otherwise, determining that the adjusting is wrong.

The standard laser radar 200 may be a laser radar adjusted by an invisible light camera or other means.

According to the method for adjusting laser radar provided by the present disclosure, since the laser device 100 has the characteristic of coaxially outputting visible light and invisible light, the invisible light in the laser radar 200 can be adjusted by observing the visible light, which is convenient for adjusting the laser radar 200; and a relatively cheap common camera may be used for adjusting, which reduces the adjusting cost and facilitates the production operation and the reduction of production cost of enterprises.

Figure 2:
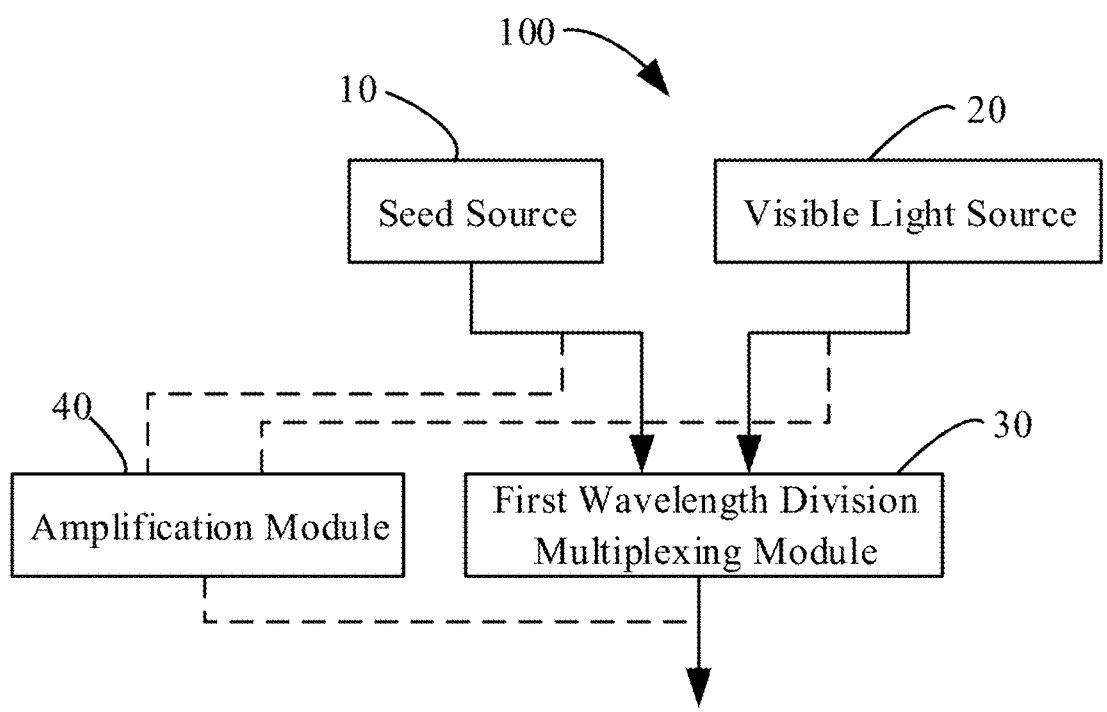
FIG. 2 is a schematic view of a laser device provided according to the present disclosure.

As shown in FIG. 2, the present disclosure further provides a laser device 100, which is applied to the laser radar 200 of the method for adjusting laser radar described above. The laser device 100 has the characteristic of coaxially outputting visible light and invisible light. The laser device 100 includes a seed source 10 that outputs invisible light, a visible light source 20 that outputs visible light, a first wavelength division multiplexing module 30 and an amplification module 40.

The seed source 10 is configured to output pulsed laser and transmit the pulsed laser to the amplification module 40 for amplification.

The first wavelength division multiplexing module 30 is configured to perform wavelength division multiplexing processing on the visible light output by the visible light source 20 and the invisible light output by the seed source 10, so as to ensure that an output end of the laser device 100 has the characteristic of coaxially outputting the visible light and the invisible light.

There are N amplification modules 40, wherein N is a positive integer. The amplification module 40 is configured to perform power amplification on a signal passing therethrough to obtain a signal with power amplified.

The laser device 100 performs wavelength division multiplexing processing on visible light and invisible light through the first wavelength division multiplexing module 30, such that the output end of the laser device 100 has the characteristic of coaxially outputting visible light and invisible light, and thus the invisible light in the laser radar 200 using the laser device 100 can be adjusted by observing the visible light, which is convenient for adjusting of the laser radar 200; and a relatively cheap common camera may be used for adjusting, which reduces the adjusting cost and facilitates the production operation and the reduction of production cost of enterprises.

Specifically, when N=1, the laser device 100 has the following two embodiments.

Figure 3:
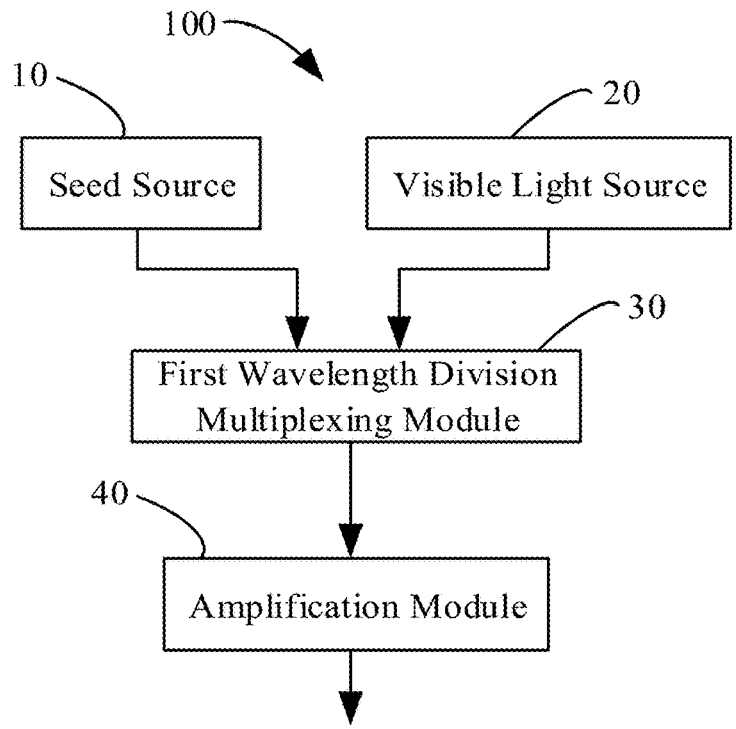
FIG. 3 is a schematic view of the laser device shown in FIG. 2 in a first embodiment.

As shown in FIG. 3, in a first embodiment, an output end of the seed source 10 is connected with a first input end of the first wavelength division multiplexing module 30. An output end of the visible light source 20 is connected with a second input end of the first wavelength division multiplexing module 30. An output end of the first wavelength division multiplexing module 30 is connected with an input end of the amplification module 40. An output end of the amplification module 40 serves as the output end of the laser device 100. The laser device 100 outputs through optical fibers.

Figure 4:
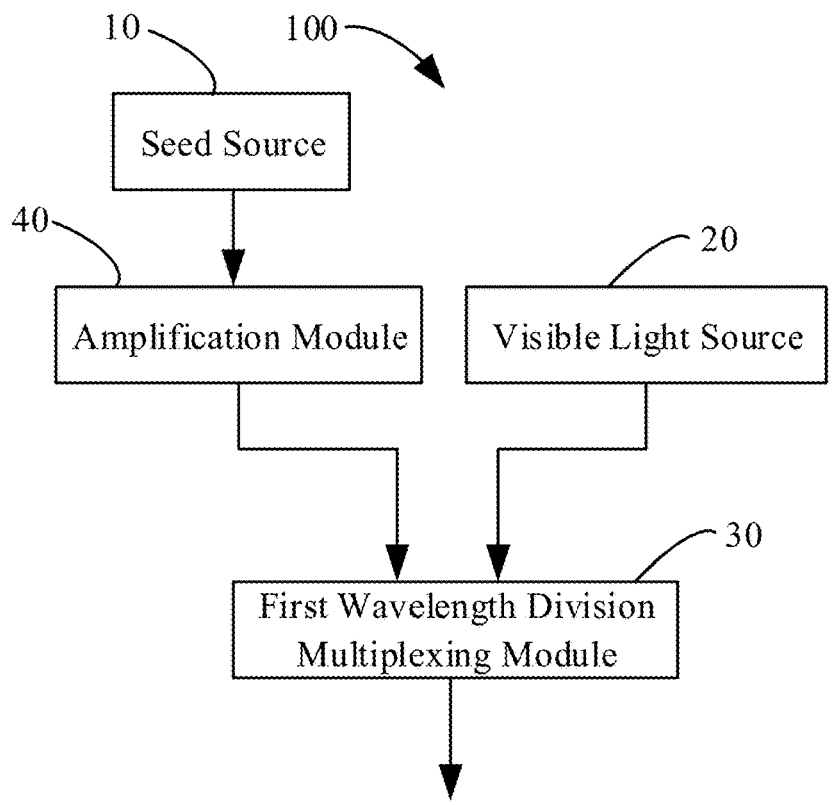
FIG. 4 is a schematic view of the laser device shown in FIG. 2 in a second embodiment.

As shown in FIG. 4, in a second embodiment, the output end of the seed source 10 is connected with the input end of the amplification module 40. The output end of the amplification module 40 is connected with the first input end of the first wavelength division multiplexing module 30. The output end of the visible light source 20 is connected with the second input end of the first wavelength division multiplexing module 30. The output end of the first wavelength division multiplexing module 30 serves as the output end of the laser device 100, and the laser device 100 outputs through optical fibers.

When N≠1, the N amplification modules 40 are defined as a first amplification module 41 to a Nth amplification module 4N in sequence. The laser device 100 has the following embodiments.

Figure 5:
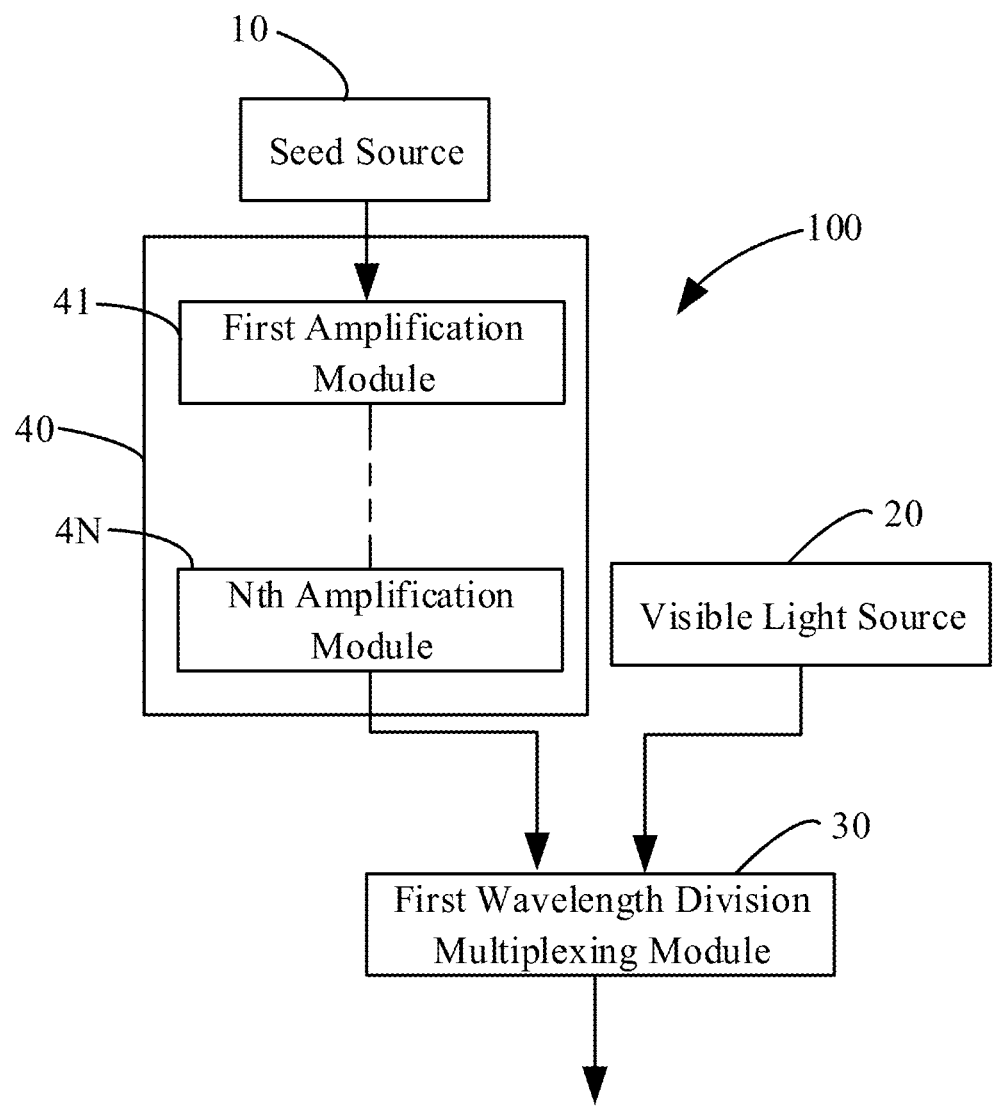
FIG. 5 is a schematic view of the laser device shown in FIG. 2 in a third embodiment.

As shown in FIG. 5, in a third embodiment, the output end of the seed source 10 is connected with the input end of the first amplification module 41. The N amplification modules 40 are connected in sequence to realize step-by-step power amplification of the signal. An output end of the Nth amplification module 4N is connected with the first input end of the first wavelength division multiplexing module 30. The output end of the visible light source 20 is connected with the second input end of the first wavelength division multiplexing module 30. The output end of the first wavelength division multiplexing module 30 serves as the output end of the laser device 100, and the laser device 100 outputs through optical fibers.

Figure 6:
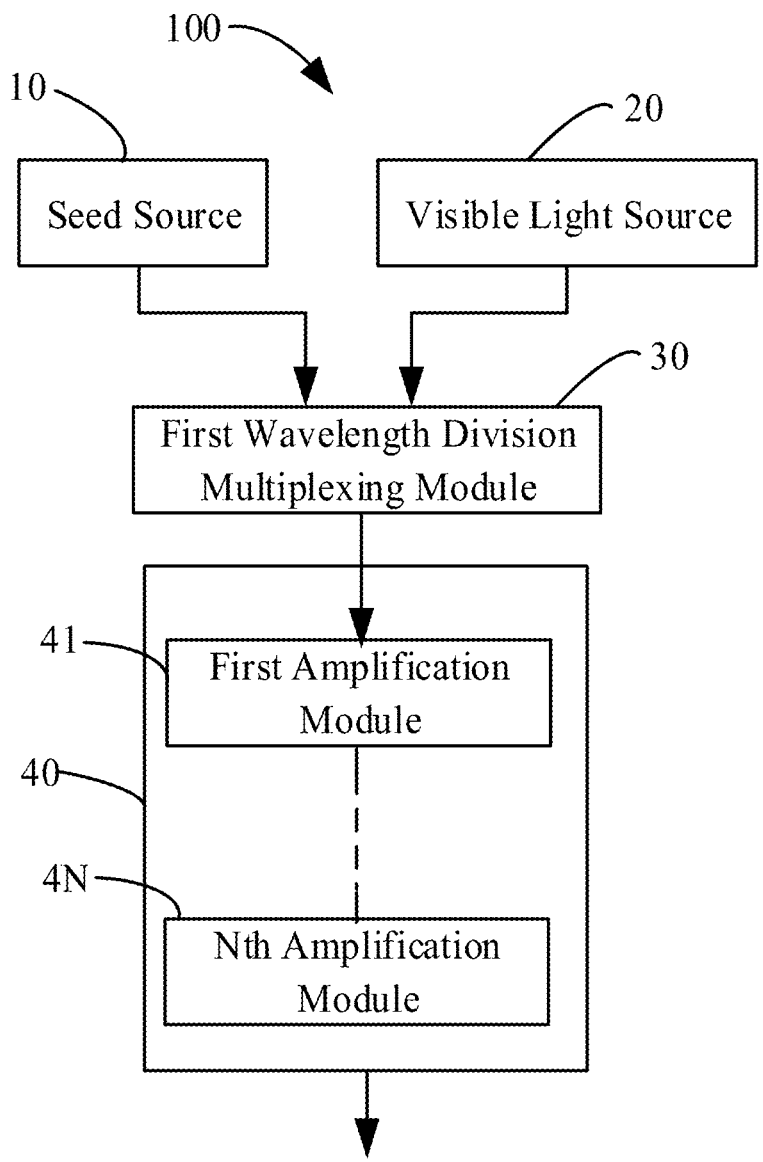
FIG. 6 is a schematic view of the laser device shown in FIG. 2 in a fourth embodiment.

As shown in FIG. 6, in a fourth embodiment, the output end of the seed source 10 is connected with the first input end of the first wavelength division multiplexing module 30. The output end of the visible light source 20 is connected with the second input end of the first wavelength division multiplexing module 30. The output end of the first wavelength division multiplexing module 30 is connected with the input end of the first amplification module 41. The N amplification modules 40 are connected in sequence to realize step-by-step power amplification of the signal. The output end of the Nth amplification module 4N serves as the output end of the laser device 100, and the laser device 100 outputs through optical fibers.

Figure 7:
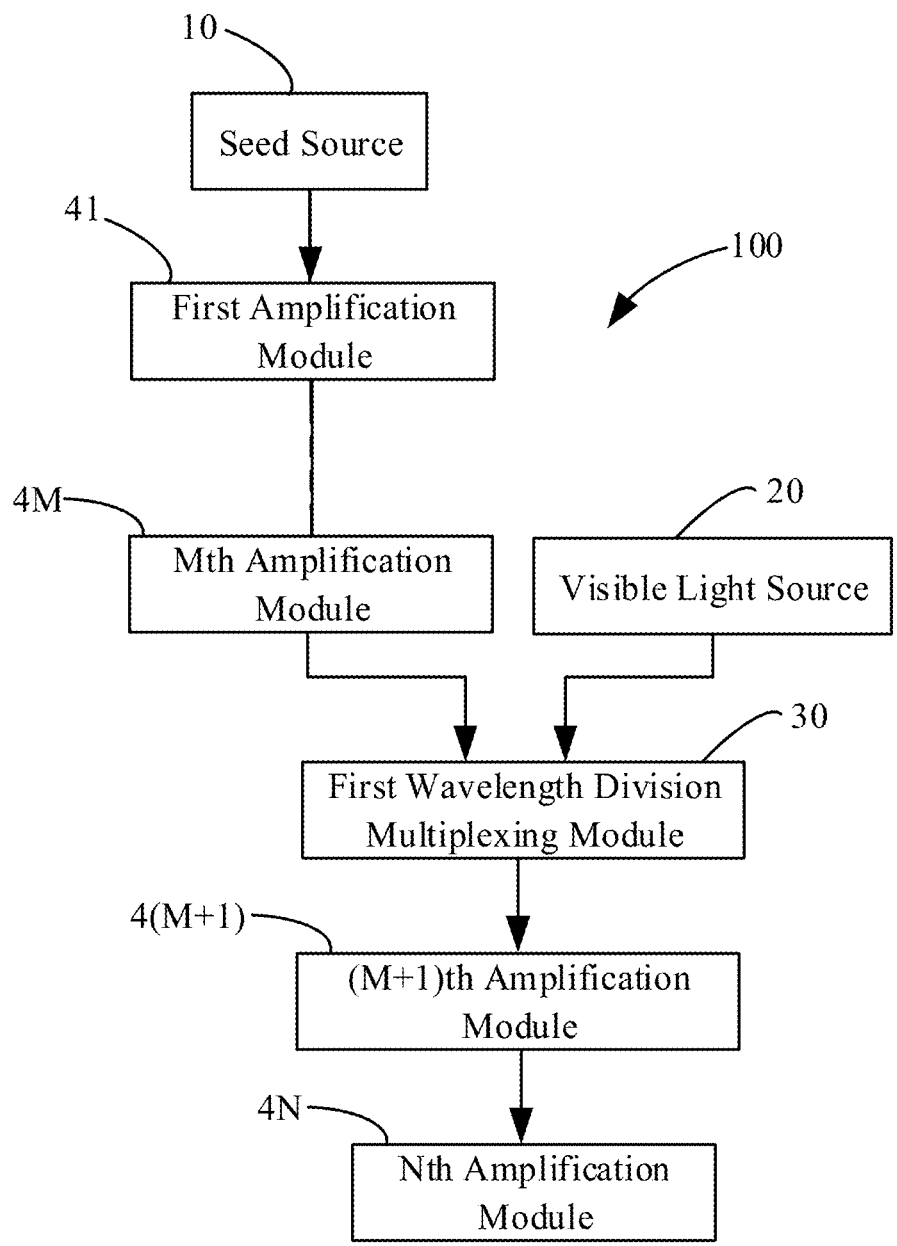
FIG. 7 is a schematic view of the laser device shown in FIG. 2 in a fifth embodiment.

As shown in FIG. 7, in a fifth embodiment, M is defined as a positive integer and the value range of M is restricted by the following relationship: M∈[1, N−1]. The Mth amplification module is 4M, and the (M+1)th amplification module is 4(M+1).

The output end of the seed source 10 is connected with the input end of the first amplification module 41. An output end of the Mth amplification module 4M is connected with the first input end of the first wavelength division multiplexing module 30. The output end of the visible light source 20 is connected with the second input end of the first wavelength division multiplexing module 30. The output end of the first wavelength division multiplexing module 30 is connected with an input end of the (M+1)th amplification module 4(M+1). The output end of the Nth amplification module 4N serves as the output end of the laser device 100, and the laser device 100 outputs through optical fibers. The N amplification modules 40 are connected in sequence to realize step-by-step power amplification of the signal.

Figure 8:
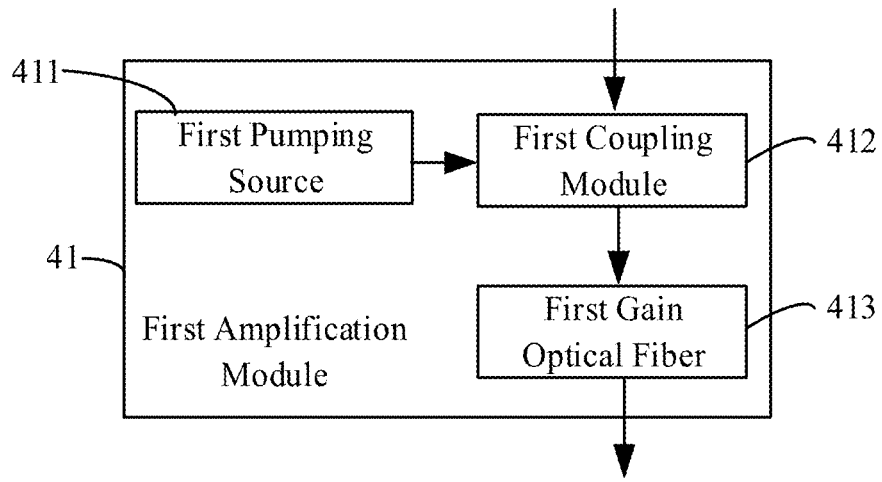
FIG. 8 is a schematic view of a first amplification module in the laser device shown in FIG. 2.

As shown in FIG. 8, the first amplification modules 40 among the N amplification modules 40 is defined as the first amplification module 41 in each of the first to fifth embodiments, and the first amplification module 41 includes a first pumping source 411, a first coupling module 412 and a first gain optical fiber 413.

The first pumping source 411 is configured to emit first pump light.

A first end of the first coupling module 412 serves as the input end of the first amplification module 41, a second end of the first coupling module 412 is connected with an output end of the first pumping source 411, and a third end of the first coupling module 412 is connected with a first end of the first gain optical fiber 413.

The first gain optical fiber 413 is configured to perform power amplification on the signal passing therethrough, and a second end of the first gain optical fiber 413 serves as the output end of the first amplification module 41.

Figure 9:
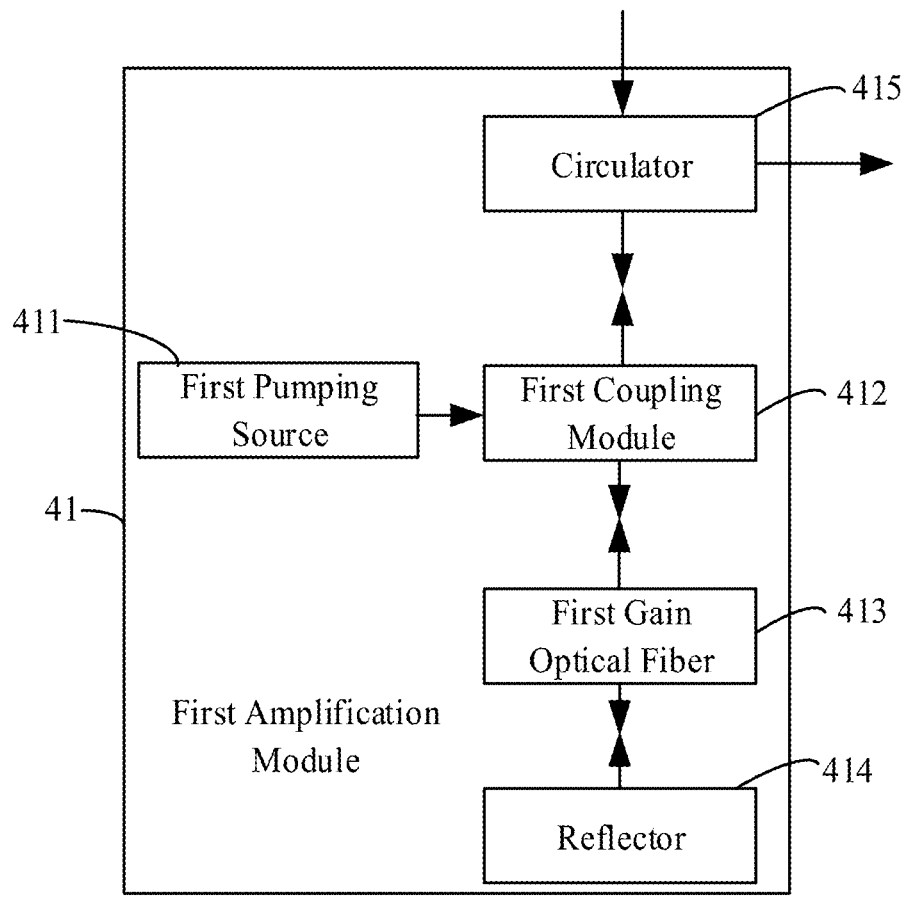
FIG. 9 is a schematic view of the first amplification module shown in FIG. 8 in another embodiment.

As shown in FIG. 9, in another embodiment, the first amplification module 41 further includes a reflector 414.

The reflector 414 is connected with the second end of the first gain optical fiber 413, and is configured to reflect pulsed laser output by the first gain optical fiber 413 after first power amplification back to the first gain optical fiber 413, such that the first gain optical fiber 413 performs second power amplification on the signal after the first power amplification.

In another embodiment, the first amplification module 41 further includes a circulator 415.

A first port of the circulator 415 serves as the input end of the first amplification module 41, a second port of the circulator 415 is connected with the first end of the first coupling module 412, and a third port of the circulator 415 serves as the output end of the first amplification module 41.

Figure 10:
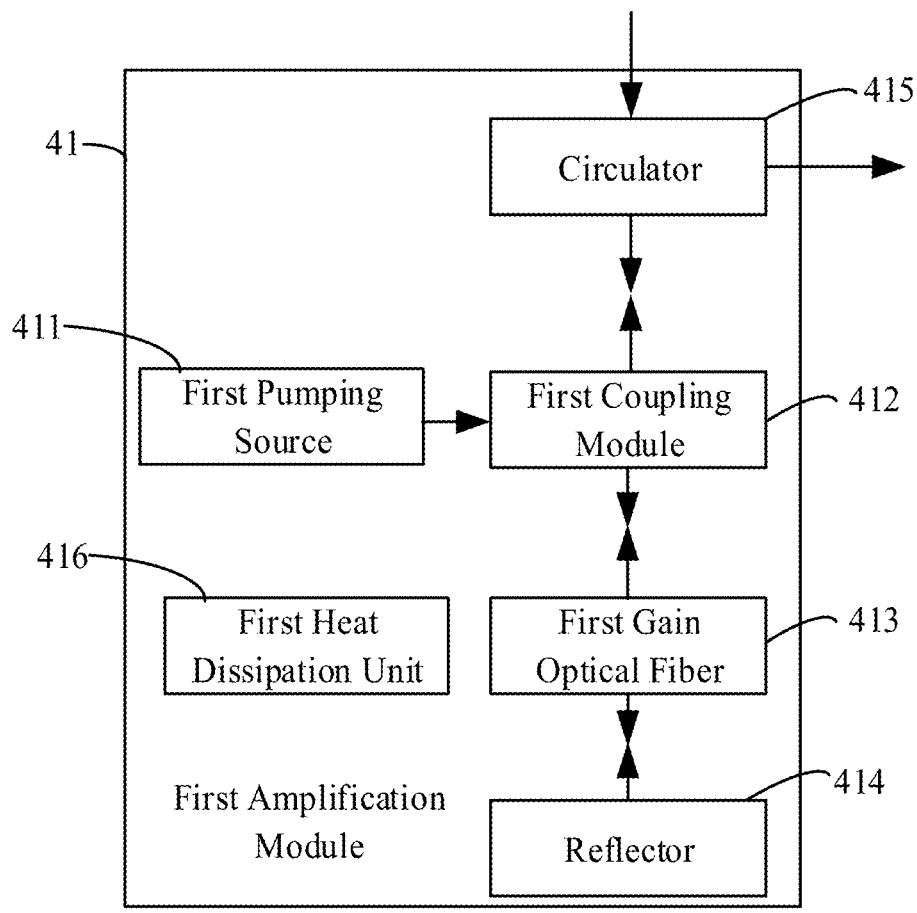
FIG. 10 is a schematic view of the first amplification module shown in FIG. 8 in yet another embodiment.

As shown in FIG. 10, in yet another embodiment, the first amplification module 41 further includes a first heat dissipation unit 416, and the first heat dissipation unit 416 is configured to perform cooling processing on the first pumping source 411.

Figure 11:
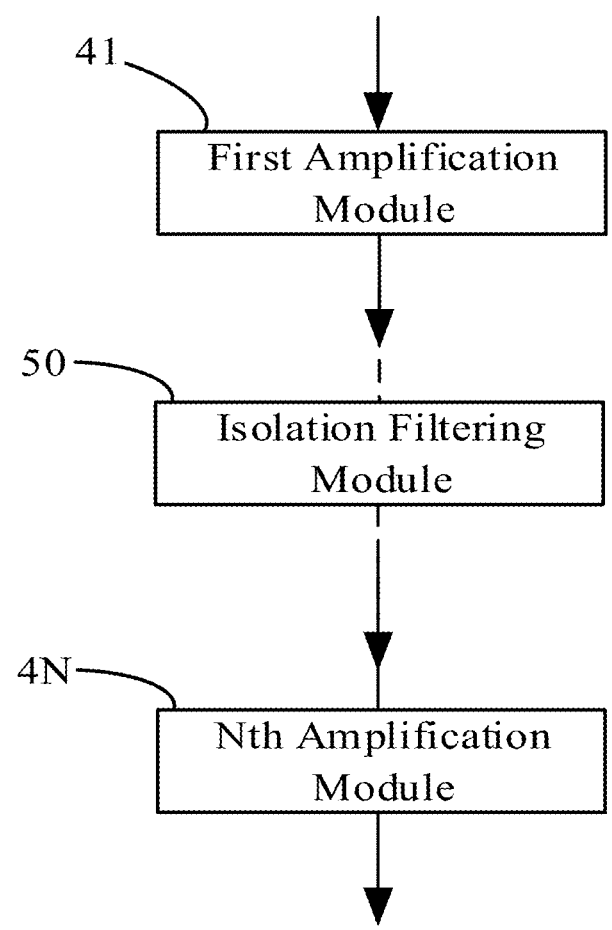
FIG. 11 is a schematic view of the laser device shown in FIG. 2 including an isolation filtering module.

As shown in FIG. 11, if N≠1, then the laser device 100 further includes an isolation filtering module 50. The isolation filtering module 50 is arranged between two amplification modules 40, so as to prevent signal backflow and filter noise.

The number of isolation filtering modules 50 is P, and P is a positive integer, and the value range of P is restricted by the following relationship: P∈[1, N−1].

Figure 12:
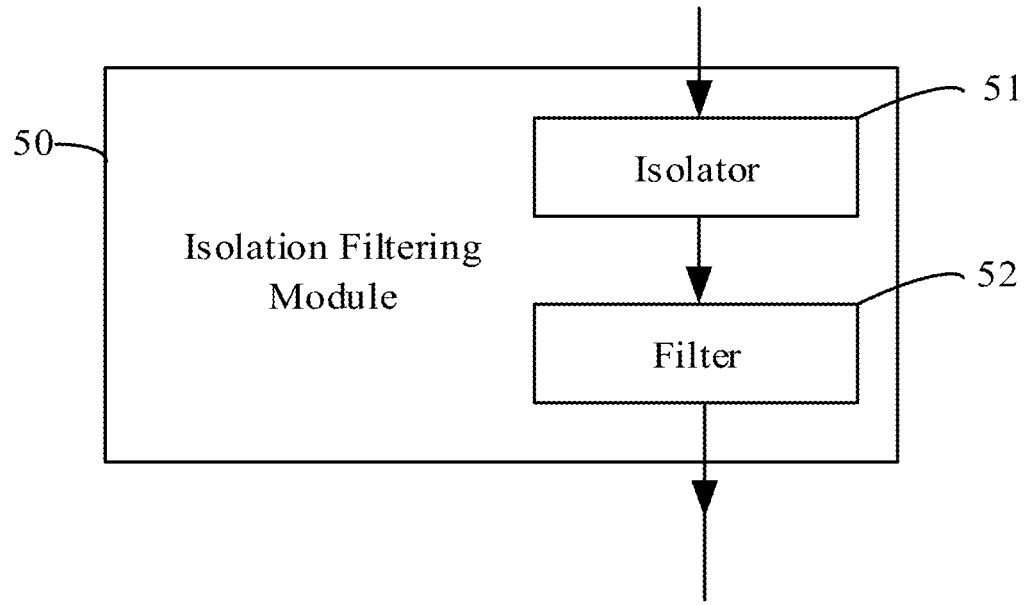
FIG. 12 is a schematic view of the isolation filtering module shown in FIG. 11.

As shown in FIG. 12, in some embodiments, the isolation filtering module 50 includes an isolator 51 and a filter 52.

In the first to fourth embodiments, an input end of the isolator 51 serves as an input end of the isolation filtering module 50. An output end of the isolator 51 is connected with an input end of the filter 52. An output end of the filter 52 serves as an output end of the isolation filtering module 50.

Figure 18:
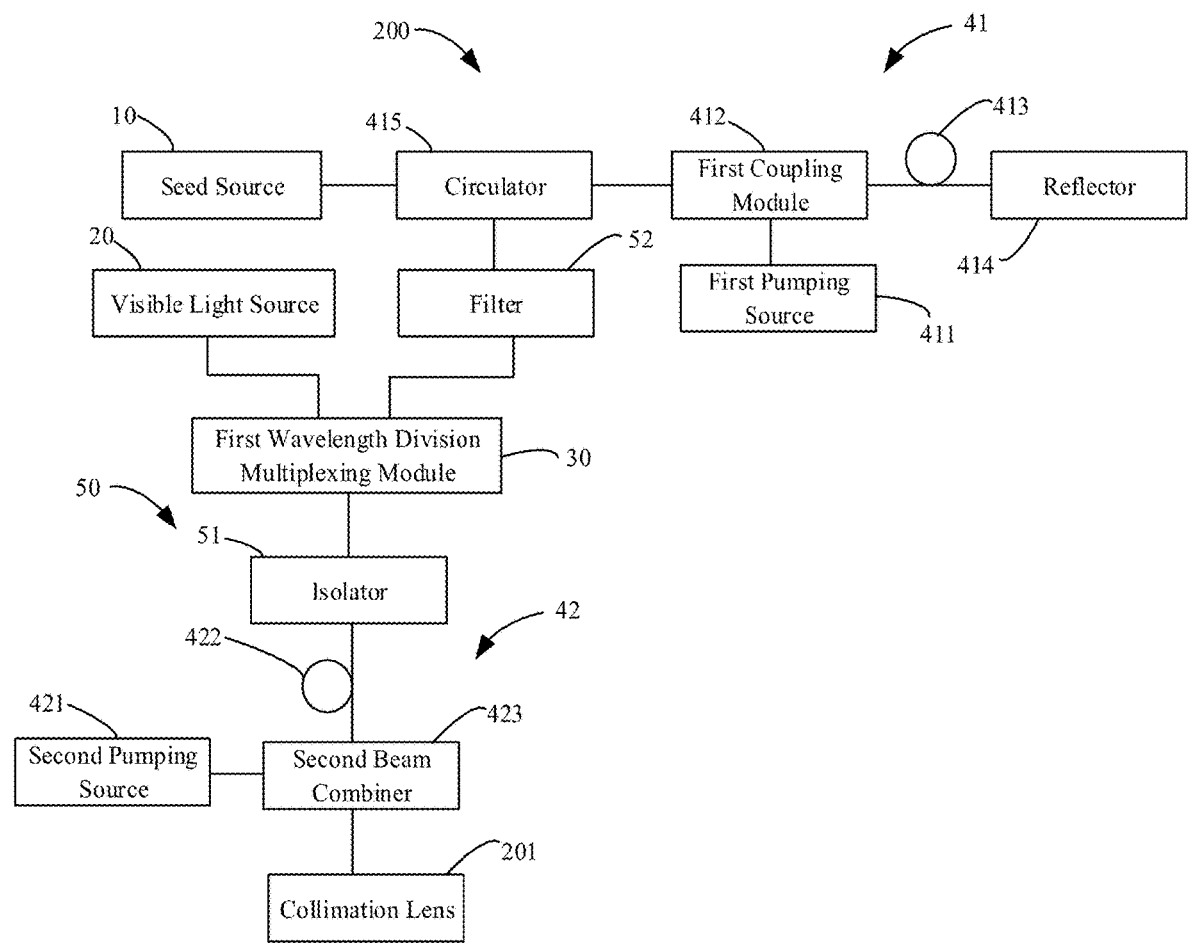
FIG. 18 is a schematic view of a laser radar in Embodiment 3.

Please refer to FIG. 7 and FIG. 18, in the fifth embodiment, the isolation filtering module 50 arranged between the Mth amplification module 4M and the (M+1)th amplification module 4(M+1) has a connection relationship different from that of the isolation filtering module 50 shown in FIG. 12.

Specifically, the input end of the filter 52 serves as the input end of the isolation filtering module 50. The output end of the Mth amplification module 4M is connected with the input end of the filter 52. The output end of the filter 52 is connected with the first input end of the first wavelength division multiplexing module 30. The output end of the visible light source 20 is connected with the second input end of the first wavelength division multiplexing module 30. The output end of the first wavelength division multiplexing module 30 is connected with the input end of the isolator 51. The output end of the isolator 51 serves as the output end of the isolation filtering module 50. The output end of the isolator 51 is connected with the input end of the (M+1)th amplification module 4(M+1).

The isolation filtering module 50 arranged between the other two amplification modules 40 may be the same as that shown in FIG. 12.

Figure 13:
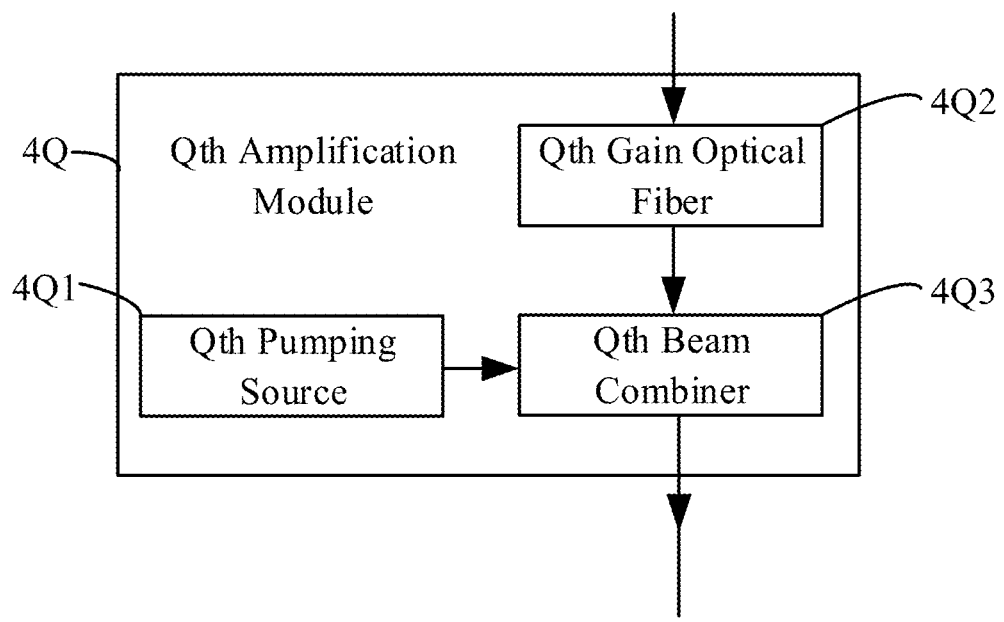
FIG. 13 is a schematic view of any amplification module except for the first amplification module in the laser device shown in FIG. 2.

As shown in FIG. 13, in some embodiments, if N≠1, then the Qth amplification module 4Q is defined as any amplification module 40 among the N amplification modules 40 except for the first amplification module 41. Q is a positive integer, and the value range of Q is restricted by the following relationship: Q∈[2, N].

The Qth amplification module 4Q includes a Qth pumping source 4Q1, a Qth gain optical fiber 4Q2 and a Qth beam combiner 4Q3.

The Qth pumping source 4Q1 is configured to emit a Qth pump light.

An input end of the Qth gain optical fiber 4Q2 serves as the input end of the Qth amplification module 4Q. An output end of the Qth gain optical fiber 4Q2 is connected with a first input end of the Qth beam combiner 4Q3.

A second input end of the Qth beam combiner 4Q3 is connected with an output end of the Qth pumping source 4Q1, and an output end of the Qth beam combiner 4Q3 serves as an output end of the Qth amplification module 4Q.

The Qth pump light and a signal output by the Qth gain optical fiber 4Q2 are incident on the Qth beam combiner 4Q3 in opposite directions.

Figure 14:
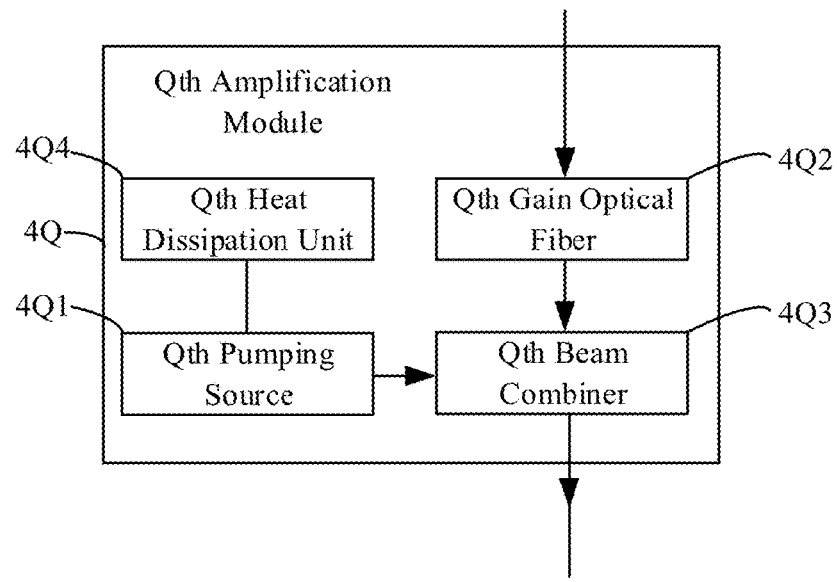
FIG. 14 is a schematic view of the amplification module shown in FIG. 13 in another embodiment.

As shown in FIG. 14, in some embodiments, the Qth amplification module 4Q further includes a Qth heat dissipation unit 4Q4, and the Qth heat dissipation unit 4Q4 is configured to perform cooling processing on the Qth pumping source 4Q1.

Figure 15:
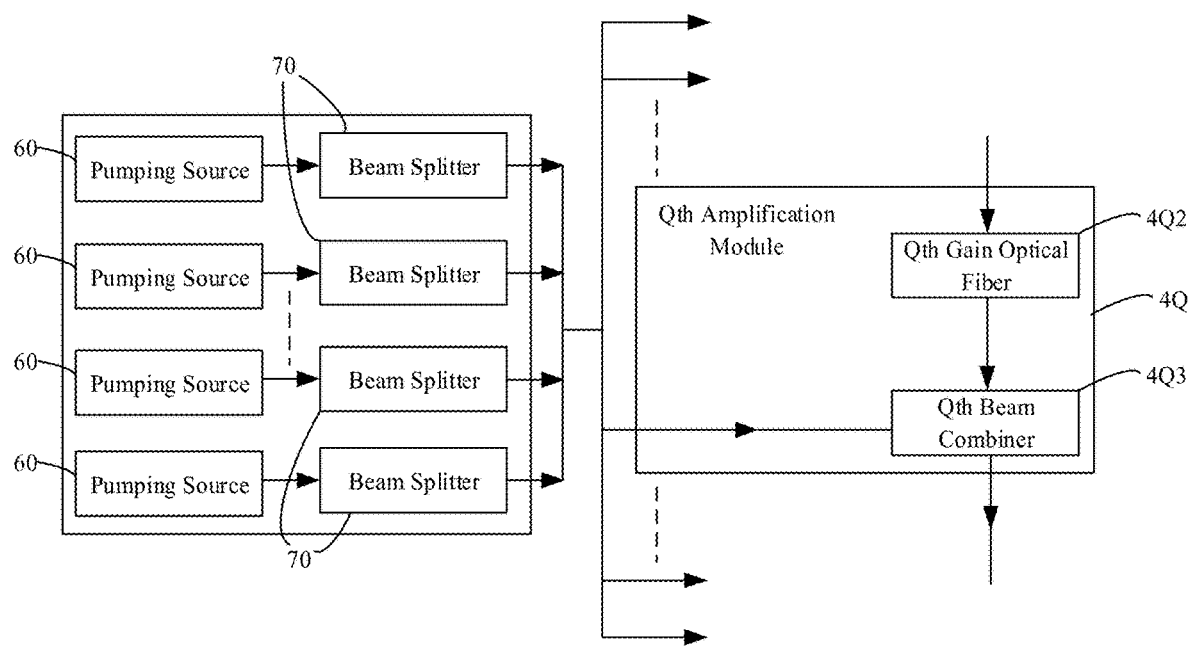
FIG. 15 is a schematic view of any amplification module except for the first amplification module in the laser device shown in FIG. 2 in another embodiment.

As shown in FIG. 15, in some other embodiments, if N>2, then the Qth amplification module 4Q is defined as any amplification module 40 among the N amplification modules 40 except for the first amplification module 41. Q is a positive integer, and the value range of Q is restricted by the following relationship: Q∈[2, N].

The laser device 100 further includes pumping sources 60 and beam splitters 70. The pumping sources 60 are connected with the beam splitters 70 in one-to-one correspondence.

The numbers of the pumping sources 60 and the beam splitters 70 are O, and O is a positive integer, and the value range of O is restricted by the following relationship: O∈[1, N−2].

The pumping sources 60 simultaneously supply energy to R amplification modules 40 except for the first amplification module 41 according to a beam splitting ratio, and the O pumping sources 60 complete the energy supply to N−1 amplification modules 40 except for the first amplification module 41. R is defined as a positive integer, and the value range of R is restricted by the following relationship: R∈[2, N−1].

The Qth amplification module 4Q includes a Qth gain optical fiber 4Q2 and a Qth beam combiner 4Q3.

An input end of the Qth gain optical fiber 4Q2 serves as the input end of the Qth amplification module 4Q. An output end of the Qth gain optical fiber 4Q2 is connected with a first input end of the Qth beam combiner 4Q3.

A second input end of the Qth beam combiner 4Q3 is connected with an output end of the beam splitter 70, and an output end of the Qth beam combiner 4Q3 serves as the output end of the Qth amplification module 4Q.

A signal output by the beam splitter 70 and a signal output by the Qth gain optical fiber 4Q2 are incident on the Qth beam combiner 4Q3 in opposite directions.

In some embodiments, if N=3, then the beam splitting ratio of the pumping source 60 ranges from 3:17 to 7:13.

The present disclosure further provides a laser radar 200, the laser radar 200 includes a collimator device 201 and the laser device 100 in any of the above embodiments, and the laser device 100 has the characteristic of coaxially outputting visible light and invisible light. The light emitted by the laser device 100 is projected onto the collimator device 201.

The laser device 100 adopted by the laser radar 200 performs wavelength division multiplexing processing on visible light and invisible light through the first wavelength division multiplexing module 30, such that the output end of the laser device 100 has the characteristic of coaxially outputting visible light and invisible light, and thus the invisible light in the laser radar 200 can be adjusted by observing the visible light, which is convenient for adjustment of the laser radar 200; and a relatively cheap common camera may be used for adjusting, which reduces the adjusting cost and facilitates the production operation and the reduction of production cost of enterprises.

The present disclosure further provides a motor vehicle including the laser radar 200 described above.

The present disclosure further provides a robot including the laser radar 200 described above.

Specifically, reference may be made to the following embodiments.

Embodiment 1

Figure 16:
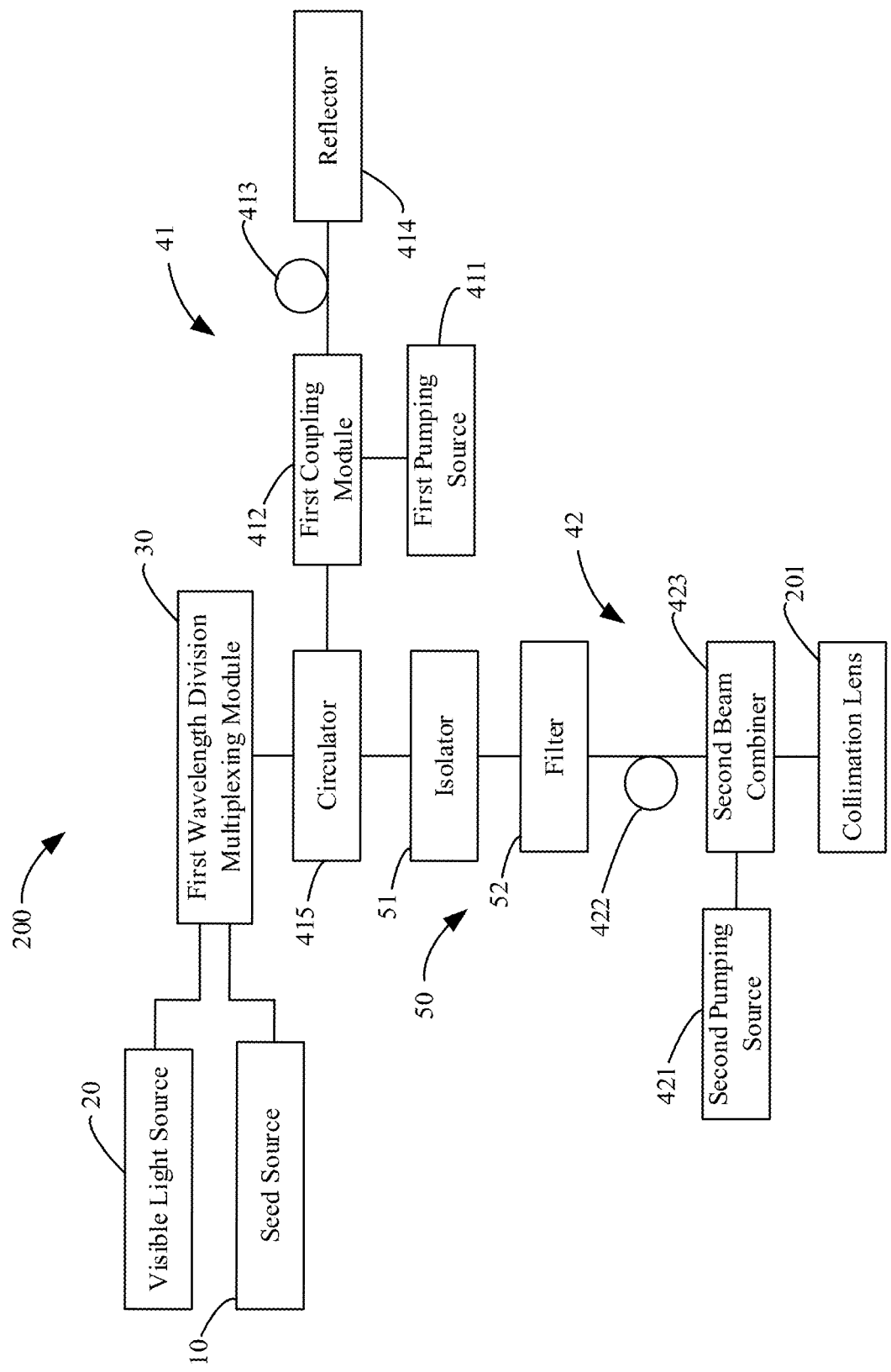
FIG. 16 is a schematic view of a laser radar in Embodiment 1.

Referring to FIG. 16, the Embodiment 1 of the present disclosure provides a laser radar 200. The laser radar 200 can coaxially output visible and invisible lasers.

The laser radar 200 includes a seed source 10, a visible light source 20, a first wavelength division multiplexing module 30, a first amplification module 41, an isolation filtering module 50, a second amplification module 42 and a collimation lens 201.

In this embodiment, the connection mode of the laser device 100 is the same as that in the fourth embodiment.

The seed source 10, the visible light source 20, the first wavelength division multiplexing module 30, the first amplification module 41, the isolation filtering module 50, the second amplification module 42 and the collimation lens 201 are connected through optical fibers.

The seed source 10 is any of infrared laser sources with wavelengths of 1550 nm, 1064 nm, 2000 nm and 1310 nm. The seed source 10 emits pulsed light with a peak power of about 10 mW through circuit modulation.

The visible light source 20 is a pigtail laser device with a wavelength of 650 nm or 532 nm. The visible light source 20 emits light with an average power of 5 mW to 10 mW through circuit modulation.

The first wavelength division multiplexing module 30 adopts a wavelength division multiplexer.

The first amplification module 41 performs primary amplification on the light passing therethrough by forward pumping. The first amplification module 41 includes a first pumping source 411, a first coupling module 412, a first gain optical fiber 413, a reflector 414 and a circulator 415.

The first pumping source 411 is a 976 nm single-mode pump.

The first gain optical fiber 413 is an erbium-doped optical fiber.

The reflector 414 is a reflecting mirror or a high reflection grating.

The circulator 415 is a three-port circulator.

The light amplified twice by the first amplification module 41 is output from the third port of the circulator 415, and the output power is on the order of about 10 mW.

The isolation filtering module 50 is used for protecting and filtering amplified spontaneous emission (ASE) light brought by the primary amplification. The isolation filtering module 50 includes an isolator 51 and a filter 52. The isolator 51 can protect the seed source 10 from damaging by the light backflow.

The second amplification module 42 performs secondary amplification on the light passing therethrough by reverse pumping. The second amplification module 42 includes a second pumping source 421, a second gain optical fiber 422 and a second beam combiner 423.

The second pumping source 421 is a 940 nm multi-mode pump.

The second gain optical fiber 422 is an erbium-ytterbium co-doped optical fiber.

The power of the light amplified by the second amplification module 42 can reach 1 W to 2 W.

Specifically, the output end of the seed source 10 is connected with the first input end of the first wavelength division multiplexing module 30. The output end of the visible light source 20 is connected with the second input end of the first wavelength division multiplexing module 30. The output end of the first wavelength division multiplexing module 30 is connected with the first port of the circulator 415.

The second port of the circulator 415 is connected with the first end of the first coupling module 412. The second end of the first coupling module 412 is connected with the output end of the first pumping source 411, and the third end of the first coupling module 412 is connected with the first end of the first gain optical fiber 413. The second end of the first gain optical fiber 413 is connected with the reflector 414. The third port of the circulator 415 serves as the output end of the first amplification module 41.

The third port of the circulator 415 is connected with the input end of the isolator 51. The output end of the isolator 51 is connected with the input end of the filter 52. The output end of the filter 52 serves as the output end of the isolation filtering module 50.

The output end of the filter 52 is connected with the input end of the second gain optical fiber 422. An output end of the second gain optical fiber 422 is connected with a first input end of the second beam combiner 423. A second input end of the second beam combiner 423 is connected with an output end of the second pumping source 421. An output end of the second beam combiner 423 serves as the output end of the second amplification module 42, and is connected with the collimation lens 201.

Embodiment 2

Figure 17:
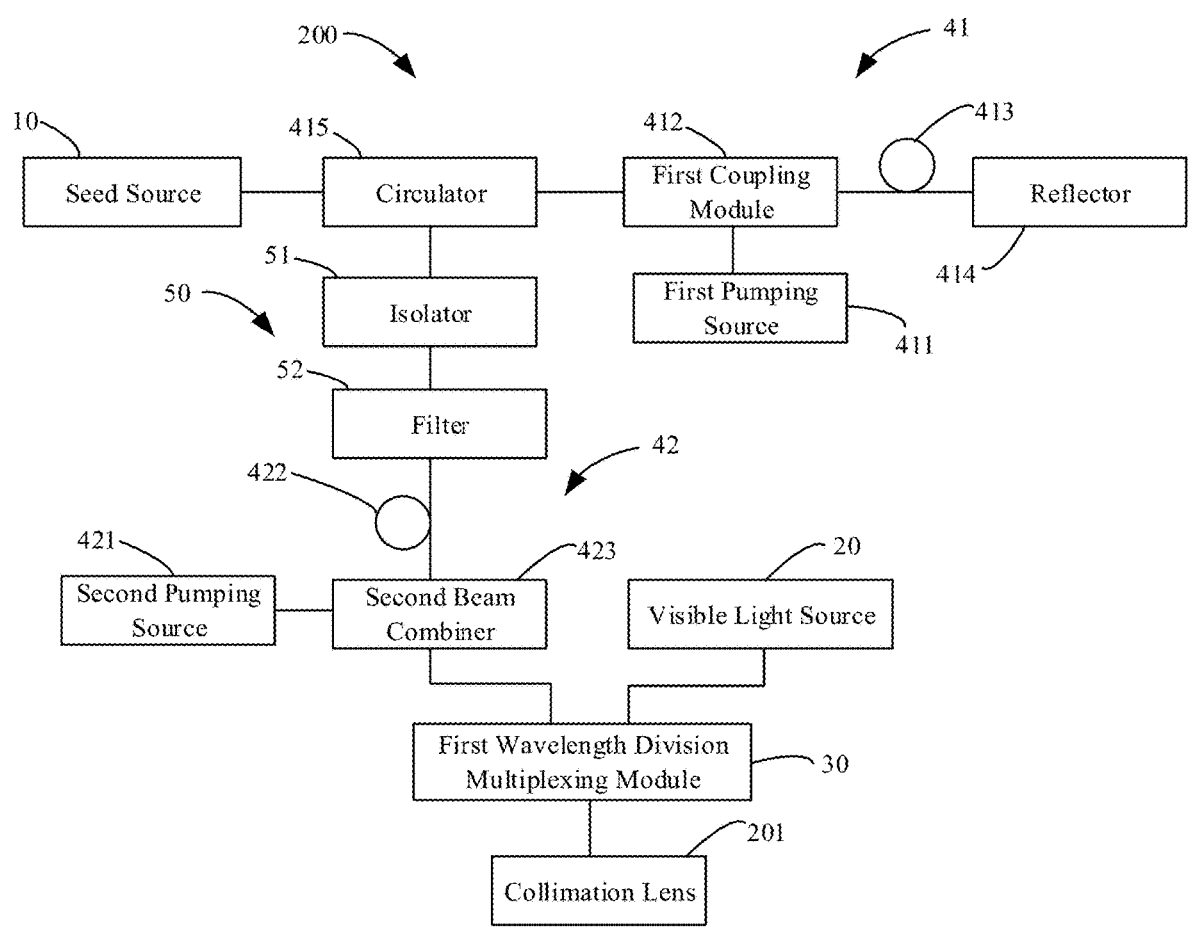
FIG. 17 is a schematic view of a laser radar in Embodiment 2.

Referring to FIG. 17, the Embodiment 2 provides a laser radar 200. The Embodiment 2 differs from the Embodiment 1 described above in that:

in this embodiment, the connection mode of the laser device 100 adopts the connection mode in the third embodiment.

Embodiment 3

Referring to FIG. 18, a laser radar 200 provided by the Embodiment 3 differs from the Embodiment 1 and the Embodiment 2 described above in that:

in this embodiment, the connection mode of the laser device 100 adopts the connection mode in the fifth embodiment.

Moreover, in this embodiment, the isolator 51 and the filter 52 of the isolation filtering module 50 are arranged in different positions from those in other embodiments.

Specifically, in this embodiment, the filter 52 is arranged between the first amplification module 41 and the first wavelength division multiplexing module 30. The isolator 51 is positioned between the first wavelength division multiplexing module 30 and the second amplification module 42.

The isolator 51 is used to prevent light backflow, the filter 52 will cause some stray light, and thus, the isolator 51 is usually placed in front of the filter 52, such that the stray light generated by the filter 52 will not cross to the front end of the isolator 51.

In this embodiment, by placing the filter 52 in front of the isolator 51, the purity of the invisible light for coupling with the visible light passing through the filter 52 is improved (the signal-to-noise ratio is higher) after the primary amplification, such that the invisible light can be better coupled with the visible light and improve the quality of the signal coupled.

In the description of this specification, descriptions made with reference to terms "one embodiment", "some embodiments", "examples", "specific examples" or "some examples" mean that specific features, structures, materials or characteristics described in connection with the embodiment or example are included in at least one embodiment or example of the present disclosure. In this specification, the schematic expressions of the above terms are not necessarily aimed at the same embodiment or example. Moreover, the specific features, structures, materials or characteristics described may be combined in any one or more embodiments or examples in a suitable manner. In addition, those skilled in the art can incorporate and combine different embodiments or examples and features of different embodiments or examples described in this specification without mutual contradiction.

Although the embodiments of the present disclosure have been shown and described above, it shall be appreciated that, the above embodiments are exemplary and should not be construed as limitations of the present disclosure, and those of ordinary skill in the art can make changes, modifications, substitutions and variations to the above embodiments within the scope of the present disclosure.

What is claimed is:

1. A laser device, capable of coaxially outputting visible light and invisible light, the laser device comprising a seed source configured to output the invisible light, a visible light source configured to output the visible light, a first wavelength division multiplexing module and N amplification modules, N being a positive integer; wherein the seed source is configured to output pulsed laser to the amplification modules;

the amplification modules are configured to perform power amplification on a signal passing therethrough to obtain a signal with power amplified;

the first wavelength division multiplexing module is configured to perform wavelength division multiplexing processing on the visible light and the invisible light to ensure that an output end of the laser device is capable of coaxially outputting the visible light and the invisible light.

2. The laser device of claim 1, wherein N=1, the amplification module is defined as a first amplification module;

an output end of the seed source is connected with a first input end of the first wavelength division multiplexing module;

an output end of the visible light source is connected with a second input end of the first wavelength division multiplexing module;

an output end of the first wavelength division multiplexing module is connected with an input end of the amplification module;

an output end of the amplification module serves as the output end of the laser device, and the laser device outputs through optical fibers.

3. The laser device of claim 1, wherein N=1, the amplification module is defined as a first amplification module;

an output end of the seed source is connected with an input end of the amplification module;

an output end of the amplification module is connected with a first input end of the first wavelength division multiplexing module;

an output end of the visible light source is connected with a second input end of the first wavelength division multiplexing module;

an output end of the first wavelength division multiplexing module serves as the output end of the laser device, and the laser device outputs through optical fibers.

4. The laser device of claim 1, wherein N≠1, the N amplification modules are defined as a first amplification module to an Nth amplification module in sequence;

an output end of the seed source is connected with an input end of the first amplification module;

the N amplification modules are connected in sequence for realizing step-by-step power amplification of the signal;

an output end of the Nth amplification module is connected with a first input end of the first wavelength division multiplexing module;

an output end of the visible light source is connected with a second input end of the first wavelength division multiplexing module;

an output end of the first wavelength division multiplexing module serves as the output end of the laser device, and the laser device outputs through optical fibers.

5. The laser device of claim 1, wherein N≠1, the N amplification modules are defined as a first amplification module to an Nth amplification module in sequence;

an output end of the seed source is connected with a first input end of the first wavelength division multiplexing module;

an output end of the visible light source is connected with a second input end of the first wavelength division multiplexing module;

an output end of the first wavelength division multiplexing module is connected with an input end of the first amplification module;

the N amplification modules are connected in sequence for realizing step-by-step power amplification of the signal;

an output end of the Nth amplification module serves as the output end of the laser device, and the laser device outputs through optical fibers.

6. The laser device of claim 1, wherein N≠1, M is defined as a positive integer and a value range of M is restricted by the following relationship: M[1, N−1];

the N amplification modules are defined as a first amplification module to an Nth amplification module in sequence;

an output end of the seed source is connected with an input end of the first amplification module;

the N amplification modules are connected in sequence for realizing step-by-step power amplification of the signal;

an output end of an Mth amplification module is connected with a first input end of the first wavelength division multiplexing module;

an output end of the visible light source is connected with a second input end of the first wavelength division multiplexing module;

an output end of the first wavelength division multiplexing module is connected with an input end of an (M+1)th amplification module;

an output end of the Nth amplification module serves as the output end of the laser device, and the laser device outputs through optical fibers.

7. The laser device of claim 4, wherein N≠1, the laser device further comprises P isolation filtering modules, and the isolation filtering modules are arranged between two of the amplification modules for preventing signal backflow and filtering noise; P is a positive integer and a value range of P is restricted by the following relationship: P[1, N−1].

8. The laser device of claim 7, wherein the isolation filtering module comprises an isolator and a filter, an input end of the isolator serves as an input end of the isolation filtering module;

an output end of the isolator is connected with an input end of the filter;

an output end of the filter serves as an output end of the isolation filtering module.

9. The laser device of claim 6, wherein N≠1, the laser device further comprises an isolator and a filter, the output end of the Mth amplification module is connected with an input end of the filter;

an output end of the filter is connected with the first input end of the first wavelength division multiplexing module;

the output end of the first wavelength division multiplexing module is connected with an input end of the isolator;

an output end of the isolator is connected with the input end of the (M+1)th amplification module.

10. The laser device of claim 4, wherein N≠1, and a Qth amplification module is defined as any amplification module among the N amplification modules except for the first amplification module, and the Qth amplification module comprises:

a Qth pumping source, configured to emit a Qth pump light;

a Qth gain optical fiber, an input end of the Qth gain optical fiber serving as an input end of the Qth amplification module;

a Qth beam combiner, a first input end of the Qth beam combiner connected with an output end of the Qth gain optical fiber, a second input end of the Qth beam combiner connected with an output end of the Qth pumping source, and an output end of the Qth beam combiner serving as an output end of the Qth amplification module;

wherein the Qth pump light and a signal output by the Qth gain optical fiber are incident on the Qth beam combiner in opposite directions;

Q is a positive integer and a value range of Q is restricted by the following relationship: Q[2, N].

11. The laser device of claim 10, wherein the Qth amplification module further comprises a Qth heat dissipation unit configured to cool the Qth pumping source.

12. The laser device of claim 4, wherein N>2, O is defined as a positive integer and a value range of O is restricted by the following relationship: O[1, N−2]; R is defined as a positive integer and a value range of R is restricted by the following relationship: R[2, N−1]; Q is defined as a positive integer and a value range of Q is restricted by the following relationship: Q[2, N];

the laser device further comprises O pumping sources and O beam splitters, the pumping sources are connected with the beam splitters in one-to-one correspondence, the pumping sources are configured to simultaneously supply energy to R amplification modules except for the first amplification module according to a beam splitting ratio, and the O pumping sources are configured to supply energy to N−1 amplification modules except for the first amplification module;

the Qth amplification module is defined as any amplification module among the N amplification modules except for the first amplification module, and the Qth amplification module comprises:

a Qth gain optical fiber, an input end of the Qth gain optical fiber serving as an input end of the Qth amplification module;

a Qth beam combiner, a first input end of the Qth beam combiner connected with an output end of the Qth gain optical fiber, a second input end of the Qth beam combiner connected with an output end of the beam splitter, and an output end of the Qth beam combiner serving as an output end of the Qth amplification module;

wherein a signal output by the beam splitter and a signal output by the Qth gain optical fiber are incident on the Qth beam combiner in the opposite directions.

13. The laser device of claim 12, wherein N=3, and the beam splitting ratio of the pumping source ranges from 3:17 to 7:13.

14. The laser device of claim 2, wherein the first amplification module comprises:

a first pumping source, configured to emit a first pump light;

a first coupling module, a first end of the first coupling module serving as an input end of the first amplification module, and a second end of the first coupling module being connected with an output end of the first pumping source;

a first gain optical fiber, configured to perform power amplification on a signal passing therethrough, a first end of the first gain optical fiber connected with a third end of the first coupling module.

15. The laser device of claim 14, wherein the first amplification module further comprises a reflector, the reflector is connected with a second end of the first gain optical fiber and is configured to reflect pulsed laser output by the first gain optical fiber after first power amplification back to the first gain optical fiber, such that the first gain optical fiber performs second power amplification on the signal after the first power amplification.

16. The laser device of claim 15, wherein the first amplification module further comprises a circulator, a first port of the circulator serves as the input end of the first amplification module, a second port of the circulator is connected with the first end of the first coupling module, and a third port of the circulator serves as an output end of the first amplification module.

17. A laser radar, comprising a collimation lens and the laser device of claim 1, wherein light emitted by the laser device is projected onto the collimation lens.

* * * * *